US009036860B2

(12) United States Patent
Chen et al.

(10) Patent No.: US 9,036,860 B2
(45) Date of Patent: May 19, 2015

(54) METHOD FOR EDITING PROPAGATION OF VIDEO AND IMAGE CONTENT BASED ON LOCAL FEATURE STRUCTURE PRESERVATION

(71) Applicant: Beihang University, Beijing (CN)

(72) Inventors: Xiaowu Chen, Beijing (CN); Dongqing Zou, Beijing (CN); Qinping Zhao, Beijing (CN); Jianwei Li, Beijing (CN); Feng Ding, Beijing (CN)

(73) Assignee: Beihang University, Beijing (CN)

( * ) Notice: Subject to any disclaimer, the term of this patent is extended or adjusted under 35 U.S.C. 154(b) by 316 days.

(21) Appl. No.: 13/693,062

(22) Filed: Dec. 4, 2012

(65) Prior Publication Data

US 2014/0071347 A1 Mar. 13, 2014

(30) Foreign Application Priority Data

Sep. 7, 2012 (CN) .......................... 2012 1 0331180

(51) Int. Cl.
| | | |
|---|---|---|
| G06K 9/00 | (2006.01) | |
| H04N 1/56 | (2006.01) | |
| H04N 1/62 | (2006.01) | |
| H04N 1/60 | (2006.01) | |
| G06T 11/00 | (2006.01) | |

(52) U.S. Cl.
CPC . *H04N 1/56* (2013.01); *H04N 1/62* (2013.01); *H04N 1/6083* (2013.01); *H04N 1/6008* (2013.01); *H04N 1/60* (2013.01); *G06T 11/001* (2013.01)

(58) Field of Classification Search
USPC ......... 382/100, 162, 163, 167, 274–276, 284; 348/576, 577; 345/581, 589–591, 593, 345/594, 600, 604, 609, 582, 618
See application file for complete search history.

(56) References Cited

U.S. PATENT DOCUMENTS

| | | | | |
|---|---|---|---|---|
| 6,947,042 | B2 * | 9/2005 | Brand ............................ | 345/428 |
| 7,756,342 | B2 * | 7/2010 | Bachmann et al. ............ | 382/224 |
| 2011/0274344 | A1 * | 11/2011 | Lee et al. ....................... | 382/155 |

OTHER PUBLICATIONS

Xiaobo An and Fabio Pellacini, "AppProp: All-Paris Appearance-Space Edit Propagation", ACM Transactions on Graphics, vol. 27, No. 3, Article 40, Aug. 2008, pp. 40:1-40:9.*
Fabio Pellacini and James Lawrence, "AppWand: Editing Measured Materials using Appearance-Driven Optimization", ACM Transactions on Graphics, vol. 26, No. 3, Article 54, Jul. 2007, pp. 54-1-54-9.*
Sam T. Roweis and Lawrence K. Saul, "Nonlinear Dimensionality Reduction by Locally Linear Embedding", Science, vol. 290, Dec. 2000, pp. 2323-2326.*
Kun Xu, Yong Li, Tao Ju, Shi-Min Hu and Tian-Qiang Liu, "Efficient Affinity-based Edit Propagation using K-D Tree", ACM Transactions on Graphics, vol. 28, No. 5, Article 118, Dec. 2009, pp. 118:1-118:6.*

* cited by examiner

*Primary Examiner* — Eric Rush

(57) ABSTRACT

The invention discloses a method for editing propagation of video and image content based on local feature structure preservation, comprising: mapping all pixels in the input original image and/or video key frames to a selected feature space; finding K nearest neighbor pixels for each pixel according to feature vectors' Euclidean distance in the selected feature space; using Locally Linear Embedding (LLE) dimension reduction to construct the locally linear relationship between each pixel and its K nearest neighbor pixels in the selected feature space; According to the present invention, it is possible to accurately perform such image or video processing as automatic color transformation, interactive color editing, gray image colorization, video cloning and image matting.

12 Claims, 7 Drawing Sheets

METHOD FOR EDITING PROPAGATION OF VIDEO AND IMAGE CONTENT BASED ON LOCAL FEATURE STRUCTURE PRESERVATION

CROSS-REFERENCE TO RELATED APPLICATION

This application claims the priority benefit of Chinese patent application No. 201210331180.2, filed on Sep. 7, 2012. The entirety of the above-mentioned patent application is hereby incorporated by reference herein and made a part of specification.

BACKGROUND OF THE INVENTION

1. Field of the Invention

The present invention relates to the field of image processing, computer vision and augmented processing technology, and in particular to the method for editing propagation of video and image content based on local feature structure preservation.

2. Background of the Invention

Editing based on the video and image contents is among the most common technology for image processing in the field of digital image processing. Example of editing based on the video and image contents may comprise, for example, changing color of the video and image (color transformation), merging objects from different video sources to form a video without editing traces (seamless cloning), extracting accurately hairs from an image (matting) or the like. For the art designers and video editors, it requires a lot of manual editions to edit the color and content of a video. In fact, there are some intrinsic relationships among content features of the video and image. In case that the video and image can be edited automatically according to these intrinsic relationships, it is possible to increase dramatically the efficiency for editing video and image.

Researches about image editing have been conducted widely. Zeev Farbman et al. proposed in 2010 an editing propagation method based on the diffusion map, in which the diffusion distance is used to measure affinity among all pixels. This method is neither efficient, nor can effectively reflect the non-affinity among pixels. In addition, this method is not appropriate for processing pixels in the color transition region.

As for color transformation, Eric Reinhard et al. in the University of Bristol firstly proposed a global method for color transformation in 2001. In this method, the target image and reference image are firstly converted from the RGB color space to the LAB color space. Then, the expectations and standard deviations along each axis of LAB color space are calculated, each pixel in the target image is scaled and shifted, and finally each pixel value is transformed back to the RGB color space. Although this method is simple and effective, the user is required to specify the reference for color transformation in case of a complex image.

As for cloning, Perez et al. proposed in 2003 a method for merging the scene and object based on the Poisson equation and the Dirichlet boundary conditions. Although the inserted object can be merged appropriately, this method consumes time and space. In 2009, Zeev Farbman et al. presented an image and video cloning method based on mean-value coordinates, which greatly improves the time and space consumption of the Poisson method. However, the mean-value cloning is susceptible to the shape of the inserted object.

Matting was firstly proposed by Jian Sun et al. in 2004. This method followed the principle of the Poisson equation to conduct the task of matting. However, this method suffers from low calculation speed and large consumption of storage space, and cannot extract the foreground well in the semi-transparent image region. Ahat Levin et al. proposed a spectral matting in 2008. Although this method improves to a certain extent the accuracy of matting, it still cannot extract the foreground well in the semi-transparent image region.

As for colorization of gray images, Welsh et al. firstly presented in 2001 a method for colorizing gray images based on gray matching. In this method, it is necessary to provide a color image which is similar to the scene of the gray image, and the gray image is colorized according to the gray matching between these two images. However, a gray image with complex scene cannot be colorized well by this method, and too much interaction may be involved during colorization.

BRIEF SUMMARY OF THE INVENTION

According to the practical requirement and the key problems, the invention aims to propose a robust and adaptive locally linear feature manifold structure preserving method to edit the user scribbles to all video key frames, no matter what shapes of the objects are. To achieve the above object or some other objects, according to the present invention, the method for editing propagation of video and image content based on local feature structure preservation may comprise:

Step S100, mapping all pixels in the input original image and/or video key frames to a selected feature space;

Step S200, finding K nearest neighbor pixels for each pixel according to feature vectors' Euclidean distance in the selected feature space;

Step S300, using Locally Linear Embedding (LLE) dimension reduction to construct the locally linear relationship between each pixel and its K nearest neighbor pixels in the selected feature space;

Step S400, mapping the user specified editing requests on the input original image and/or video key frames to all or a part of pixels in the input original image and/or video key frames in the selected feature space;

Step S500, according to the locally linear relationship in Step S300 and by means of the resulting editing requests in Step S400, propagating the user specified editing requests to all other pixels in the input original image and/or video key frames;

Step S600, reversely mapping all pixels which have been modified by propagation in the selected feature space to the input original image and/or video key frames, and replacing the corresponding pixels in the input original image and/or video key frames, so as to generate the resulting image and/or video key frames.

Preferably, during mapping all pixels in the input original image and/or video key frames to the selected feature space in step S100, the feature space is selected according to the specified different application requirements, including automatic color transformation, interactive color editing, gray image colorization, video cloning and image matting.

For automatic color transformation and interactive video objects recoloring, the selected feature space is a RGB color space.

For video cloning and image matting, we define a RGBXYT six-dimensional feature space as the concatenated RGB color and spatial temporal coordinate (x, y, t). Here (x, y) is the spatial coordinates and t is the video frame index.

For gray image colorization, the selected feature space concatenates the grayscale intensity, texture, and SIFT features.

Preferably, finding K nearest neighbors for each pixel in the given feature space in step S200 is to find its K nearest neighbors in the selected feature space for each pixel.

For automatic color transformation and interactive video objects recoloring, the K nearest neighbors are the neighbors with minimum color distance in RGB space.

For video cloning and image matting, the K nearest neighbors are the neighbors with minimum color and spatial distance.

For gray image colorization, the K nearest neighbors are the closest in the Intensity-SIFT-Texture-Coordinate feature space.

The distance is a Euclidean distance.

Preferably, using Locally Linear Embedding (LLE) dimension reduction to construct the locally linear relationship between each pixel and its K nearest neighbor pixels in the selected feature space in step S300 may comprise:

finding K nearest neighbors with minimum Euclidean distance for each pixel in the given feature space; and computing a set of weights that can best reconstruct the current pixel from its K neighbors.

Preferably, as an embodiment, the set of weight coefficients that best linearly reconstruct the pixel from the K nearest neighbors can be computed by constructing a matrix of the sum of squared differences between the pixel and its K neighbors and solving the optimization equation with the least square method.

Preferably, suppose a vector $X_i$ to represent a pixel i in some feature space. For $X_i$, we find its K nearest neighbors, namely $X_{i1}; \ldots; X_{iK}$. We compute a set of weights $W_{ij}$ that can best reconstruct $X_i$ from these K neighbors. Specifically, we compute $W_{ij}$ by minimizing $$\min \sum_{i=1}^{N} \left\| X_i - \sum_{j=1}^{K} w_{ij} X_{ij} \right\|^2,$$

which is subject to the constraint $$\sum_{j=1}^{K} w_{ij} = 1.$$

The result matrix $\{w_{ij} | i=1, \ldots, N\}$ captures the manifold structure of this data set in the feature space.

Suppose the user specifies the results $g_i$ for a subset of pixels S. The algorithm can propagate this editing to the whole image by inferring a value $z_i$ at each pixel by minimizing the following energy $$E = \lambda \sum_{i \in S} (z_i - g_i)^2 + \sum_{i=1}^{N} \left( z_i - \sum_{z_j \in N_i} w_{ij} z_j \right)^2.$$

Here, $z_i$ is the edited result at pixel i.

Preferably, mapping the user specified editing requests on the input original image and/or video key frames to all or a part of pixels in the input original image and/or video key frames in the selected feature space in step S400 may comprise:

mapping the target color theme to the source color theme of the source image or video according to both color theme distance for automatic color transformation;

mapping the user specified colors to the corresponding pixels' colors in the key frame for interactive color editing;

according to the given tri-map, getting the definite foreground region, definite background region and the uncertain region for image matting;

according to the user specified source region in the source image or video and the selected location to insert the user specified region in the target image or video, constructing the mapping between the pixels set in boundary of the source region and that in the target image or video for video cloning;

mapping the colors to the corresponding super-pixels according to the user scribbles.

Preferably, the step 500 may comprise:

propagating the color theme to all pixels in the image or video for the application of automatic color transformation.

propagating the user specified color to all other pixels in the image or video for the application of the interactive color editing;

propagating the probability to the pixels in the uncertain regions to obtain the probability of the pixel belongs to the foreground region;

propagating the colors difference of the pixels colors in the source boundary with the pixels colors in the corresponding location of the target image or video to the inner region of the insert source region for video cloning, wherein the final color of each pixel in the insert region is the sum of the source color and the obtained difference after propagation;

propagating the user scribbles colors to all super pixels according to the locally linear manifold structure of super pixels for the application of gray image colorization.

Compared with existing technologies, the invention has following advantages. Firstly, the invention gives a method which can be applied to various applications, such as automatic color transformation, interactive color editing, gray image colorization, video cloning and image matting. Secondly, the framework proposed by the invention is simple and effective and does not require a lot of manual editing or professional skills. User will be able to get the desired results in a short period of time with just a little rough interaction, which is effective and time-saving. Thirdly, the invention effectively solves the locally linear manifold structure problem in the color transition area in the video and image while avoids artifacts in these regions. Fourthly, the method proposed by the invention can protect the image and video editing propagation from the influence of the shape of the object with a certain degree of adaptability and robustness.

DETAILED DESCRIPTION OF THE EMBODIMENTS

In order to make the objects, technical solutions and advantages of the present invention clearer, the method for editing propagation of video and image content based on local feature structure preservation of the present invention will be explained hereinafter with reference to the accompanying drawings and embodiments. It should be understood that the specific examples described herein only intend to explain the present invention and by no means to limit the scope of the present invention.

The present invention proposes a framework which can preserve local features manifold structure in video and image while avoiding artifacts during video and image processing. At the same time, the framework is applied to five typical applications such as automatic color transformation, interactive color editing, image matting, video cloning and gray image colorization.

The local features manifold structure preserving for editing propagation in video and image method of the present invention has the following advantages: For the areas of color transition in video and image, the method can preserve the local features manifold structure between the pixels in these areas during video and image editing process while avoiding problems in these areas such as color division and color overflow and ensure the color of the generated result transits smoothly.

Figure 1:
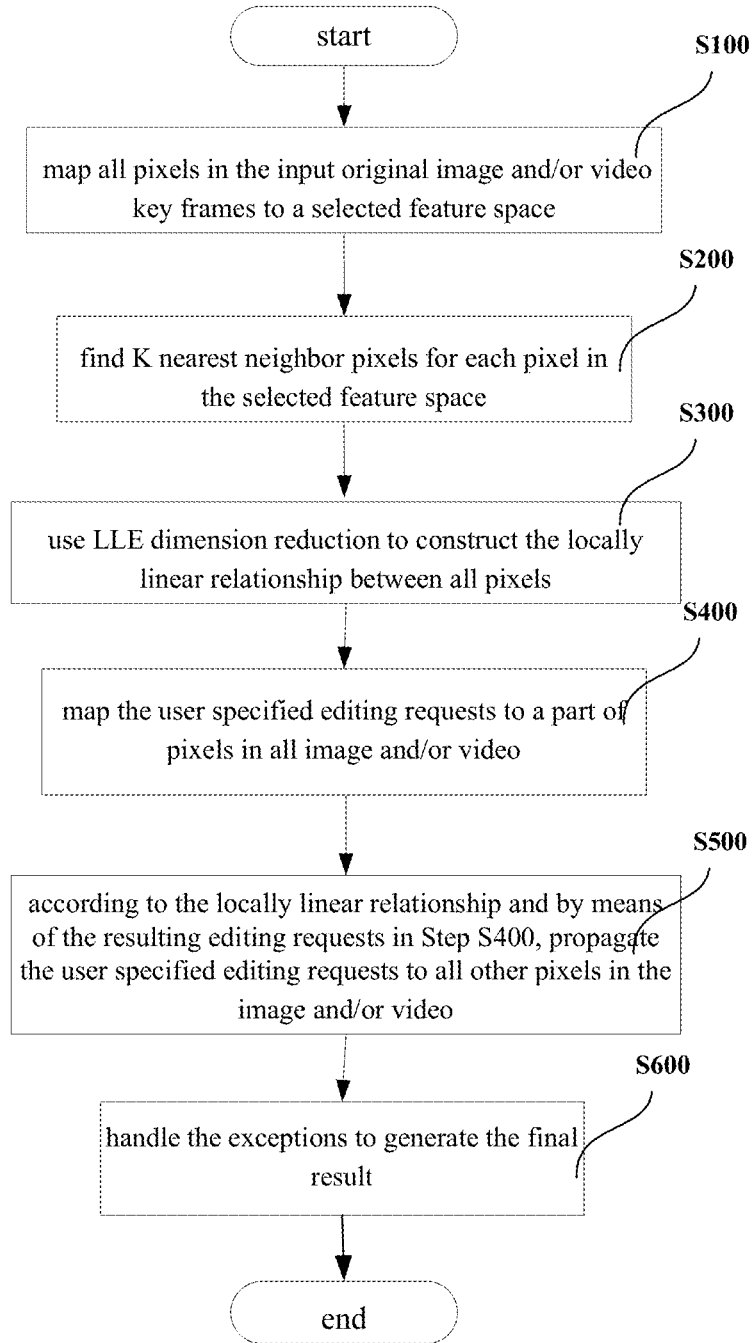
FIG. 1 is the flowchart of the method for editing propagation of video and image content based on local feature structure preservation according to the present invention.

The present invention proposes a method for editing propagation of video and image content based on local feature structure preservation. As shown in FIG. 1, the method consists of the following steps:

Step S100, mapping all pixels in the input original image and/or video key frames to a selected feature space.

To map all pixels in the image or video to the selected feature space, as an embodiment, is to select the feature space according to the corresponding different application requirements, including automatic color transformation, interactive color editing, gray image colorization, video cloning and image matting.

Specifically, for automatic color transformation and interactive video objects recoloring, the selected feature space is a RGB color space.

For video cloning and image matting, we define a six-dimensional RGBXYT feature space as the concatenated RGB color and spatial temporal coordinates (x, y, t). Here (x, y) is the spatial coordinate and t is the video frame index.

For gray image colorization, the selected feature space is Intensity-SIFT-Texture-Coordinate.

Step S200, finding K nearest neighbor pixels for each pixel according to feature vectors' Euclidean distance in the selected feature space.

As an embodiment, to find K nearest neighbors for each pixel in the given feature space is to find its K nearest neighbors in the selected feature space for each pixel.

Specifically, for automatic color transformation and interactive video objects recoloring, the K nearest neighbors are the neighbors with minimum color distance in the RGB space.

For video cloning and image matting, the K nearest neighbors are the neighbors with minimum color and spatial distance.

For gray image colorization, the K nearest neighbors are closest ones in the Intensity-SIFT-Texture-Coordinate feature space.

Herein the distance is a Euclidean distance.

Step S300, using Locally Linear Embedding (LLE) dimension reduction to construct the locally linear relationship between each pixel and its K nearest neighbor pixels in the selected feature space.

Using LLE to represent each pixel as a linear combination of its neighbors in a feature space and constructing the manifold structure for all pixels is to calculate the relationship between all pixels in the feature space. The relationship substantially reflects the similarity and distinguishability between pixels. Hence, for the colors in the transition area, in order to preserve the relationship between them and distinguishability from colors in other regions, the more K nearest neighbors, the better the local features manifold structure for editing propagation in video and image is preserved.

Preferably, as an embodiment, using LLE dimension reduction to construct the locally linear relationship between each pixel and its K nearest neighbor pixels in the selected feature space in step S300 may comprise:

finding K nearest neighbors with minimum Euclidean distance for each pixel in the given feature space;

computing a set of weights which can best reconstruct the current pixel from its K neighbors.

Preferably, as an embodiment, the set of weight coefficients that best linearly reconstruct the pixel from the K nearest neighbors can be computed by constructing a matrix of the sum of squared differences between the pixel and its K neighbors and solving the optimization equation with the least square method.

Preferably, suppose a vector $X_i$ to represent a pixel i in some feature space. For $X_i$, we find its K nearest neighbors, namely $X_{i1}; \ldots; X_{ik}$. We compute a set of weights $w_{ij}$ that can best reconstruct $X_i$ from these K neighbors. Specifically, we compute $W_{ij}$ by minimizing $$\min \sum_{i=1}^{N} \left\| X_i - \sum_{j=1}^{K} w_{ij} X_{ij} \right\|^2,$$

which is subject to the constraint $$\sum_{j=1}^{K} w_{ij} = 1.$$

The result matrix $\{w_{ij}|i=1, \ldots, N\}$ captures the manifold structure of this data set in the feature space.

Suppose the user specifies the results $g_i$ for a subset of pixels S. The algorithm can propagate this editing to the whole image by inferring a value $z_i$ at each pixel by minimizing the following energy:

$$E = \lambda \sum_{i \in S} (z_i - g_i)^2 + \sum_{i=1}^{N} \left( z_i - \sum_{z_j \in N_i} w_{ij} z_j \right)^2.$$

Here, $z_i$ is the edited result at pixel i.

The step S300 which preserve the local features manifold structure between the pixels in color transition areas during video and image editing process can avoid problems in these areas, such as color division and color overflow.

Step S400, mapping the user specified editing requests on the input original image and/or video key frames to all or a part of pixels in the input original image and/or video key frames in the selected feature space.

In order to apply the local features manifold structure preserving framework to different applications, the user specified editing requests are different.

Specifically, for video objects recoloring, the user specified editing requests are to specify new color for some objects or regions, label new colors to some pixels. Hence, we can map the labeled pixels' color to the colors that user specified.

For image matting, the user specified editing requests are to classify the regions into foreground, background and uncertain. Hence, we can map the pixels color to foreground, background or uncertain region.

For video cloning, the user specified editing requests is the spatial position the object will be inserted. According to the position, we can map the pixels on the boundary of the object to the pixels in the target image overlaid by the boundary.

For gray image colorization, the user specified editing requests are to specify new color for some objects or regions, and label new colors to some pixels.

Preferably, mapping the user specified editing requests on the input original image and/or video key frames to all or a part of pixels in the input original image and/or video key frames in the selected feature space in step S400 may comprise:

mapping the target color theme to the source color theme of the source image or video according to both color theme distance for automatic color transformation.

Preferably, as an embodiment, the color theme can be specified manually or extracted from other video and image according to eleven basic colors.

As an embodiment, the source color theme extraction clusters the original colors with eleven basic colors or using K-means clustering, and then computes the mean color for each type to generate the color theme.

mapping the user specified colors to the corresponding pixels' colors in the key frame for interactive color editing;

according to the given tri-map, getting the definite foreground region, definite back-ground region and the uncertain region for image matting;

according to the user specified source region in the source image or video and the selected location to insert the user specified region in the target image or video, constructing the mapping between the pixels set in boundary of the source region and that in the target image or video for video cloning.

Preferably, as an embodiment, the video cloning uses LLE to represent each pixel as a linear combination of pixels on the boundary to achieve color interpolation.

mapping the colors to the corresponding super-pixels according to the user scribbles;

propagating the specified editing requests to all other pixels based on the step S400 while maintaining the manifold structure in the result image or video.

The specified editing requests are propagated to all other pixels, while the manifold structure in the result image or video is maintained. In more detail, according to the specified user editing requests such as automatic color transformation, interactive color editing, image matting, video cloning and gray image colorization, manifold structure between pixels and user specified editing requests or mappings, the user editing requests are propagated to all other pixels.

Specifically, as an embodiment, for automatic color transformation and interactive video objects recoloring, the user specified color or color theme is propagated to all other pixels.

For image matting, the probability of foreground of each other pixels by propagating the specified foreground and background pixels is calculated.

For video cloning, the color difference along the boundary to the pixels in the object is propagated.

For gray image colorization, the specified color to other super pixels based on the relationship between gray image and its super pixels is propagated.

Preferably, propagating the specified editing requests to all other pixels based on the step S400 while maintaining the manifold structure in the result image or video in step 500 may comprise:

propagating the color theme to all pixels in the image or video for the application of automatic color transformation;

propagating the user specified color to all other pixels in the image or video for the application of the interactive color editing;

propagating the probability to the pixels in the uncertain regions to obtain the probability of the pixel belongs to the foreground region according to the tri-map;

propagating the colors difference of the pixels colors in the source boundary with the pixels colors in the corresponding location of the target image or video to the inner region of the insert source region for video cloning, wherein he final color of each pixel in the insert region is the sum of the source color and the obtained difference after propagation;

propagating the user scribbles colors to all super pixels according to the locally linear manifold structure of super pixels for the application of gray image colorization;

optimizing the results by processing the artifacts such as color overflow, local smooth of patches.

The following examples illustrate the local features manifold structure preserving for editing propagation in video and image method of the present invention.

Figure 2:
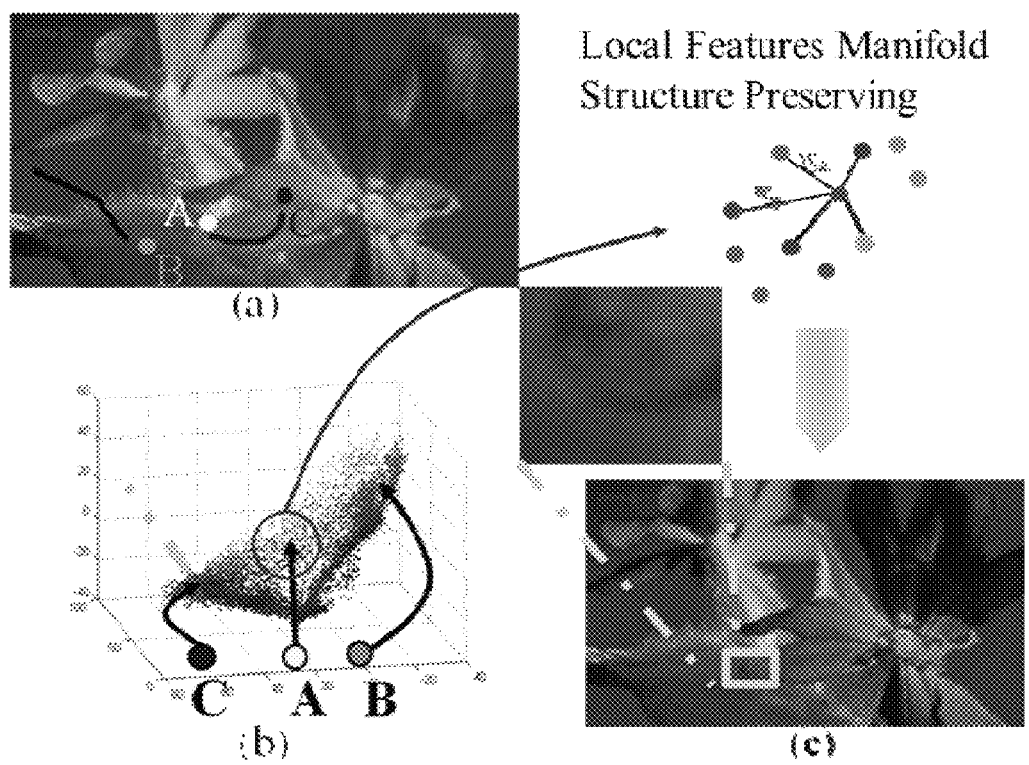
FIG. 2 (a)-FIG. 2 (c) are schematic diagrams showing the principles of the present invention.

Let's take interactive color editing as example. As shown in FIG. 2, the pixel A in FIG. 2 (a) is in the color transition region, while the pixel B and pixel C in FIG. 2 (a) are in regions whose color are consistent.

FIG. 2 (b) is the distribution of pixels of FIG. 2(a) in the LAB color space. It is clear that pixel A is in the transition region between pixel B and pixel C.

FIG. 2 (c) is the result generated by the manifold structure preserving method of the present invention. It indicates that the method of the present invention has advantages in processing video and image with color transition regions compared with existing technologies. Overall, the method for editing propagation of video and image content based on local feature structure preservation of the present invention can be divided into two steps: (1) constructing local features manifold structure; and (2) propagating the specified editing requests to all other pixels in the result video and image.

Figure 3:
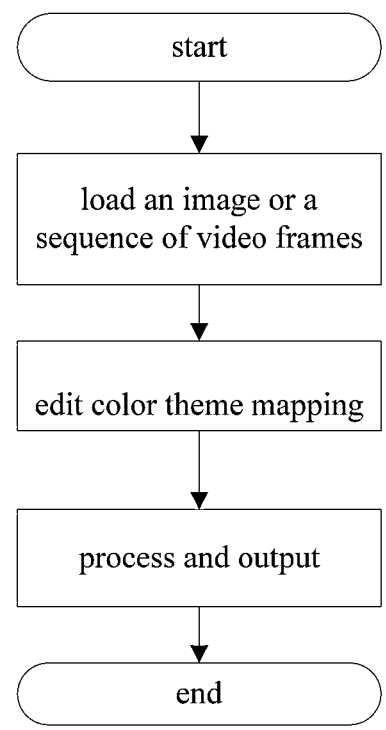
FIG. 3 is the flowchart showing automatic color transformation of the present invention.

FIG. 3 is the flowchart showing automatic color transformation of the present invention. The embodiment extracts the color theme from the source video, then maps it to the specified color theme and generates the result. The color theme of the video or image is a set of colors that can represent the color style of the video or image.

As an embodiment, preferably, calculating the color theme may comprise the following steps:

firstly, classifying the pixels into several colors by K-means clustering and computing the count of each color;

then, computing the sum of each color in RGB color space; and finally, computing the mean color for each color as one basic color of the color theme.

The optimized mapping relationship is obtained by computing the sum of Euclidean distance between the two color themes.

Figure 4:
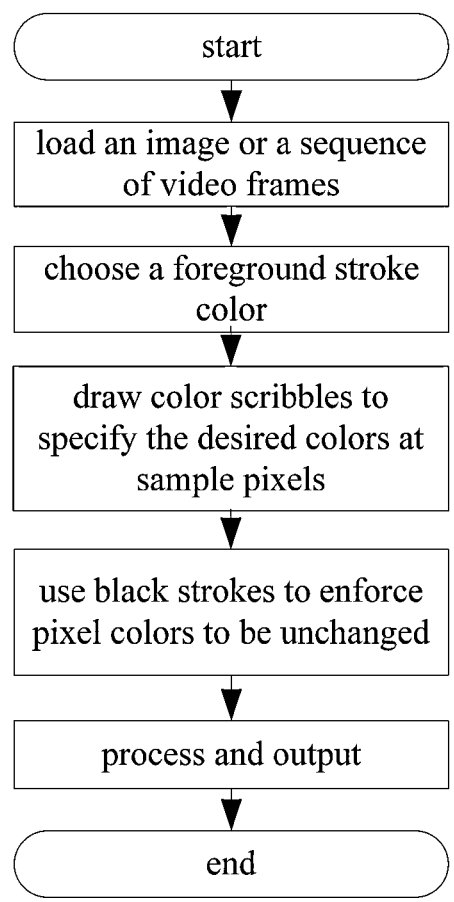
FIG. 4 is the flowchart showing interactive color editing of the present invention.

FIG. 4 is the flowchart of interactive color editing which aimed to modify the color of the video or image under the guidance of specified colors to certain regions or objects in the key frame. In this embodiment, the user draws color scribbles to specify the desired colors at some sample pixels and uses black strokes to enforce pixel colors to be unchanged. Then, under the constraint of user editing requests, the result is generated by propagating the editing requests to all other pixels according to the local features manifold structure.

Figure 5:
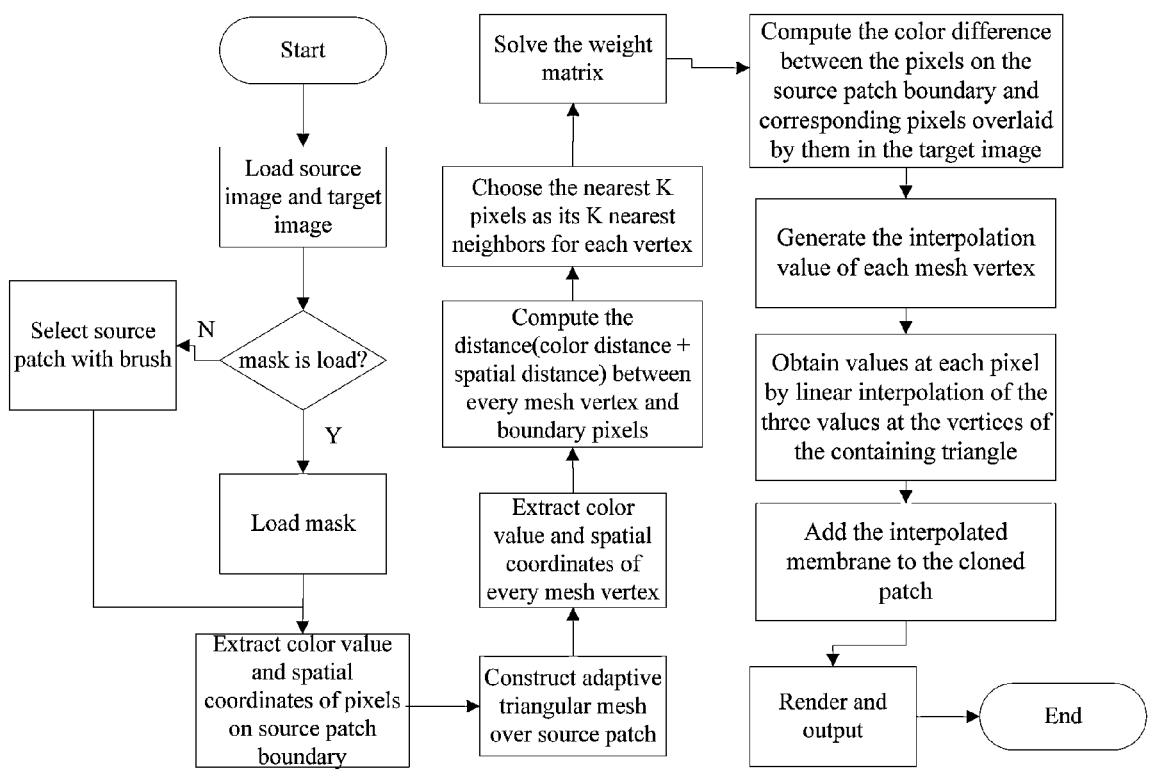
FIG. 5 is the flowchart showing video cloning of the present invention.

FIG. 5 is the flowchart showing video cloning which aims to seamlessly clone the object into a target scene and ensure the visual reasonableness of the result.

As an embodiment, the seamless cloning may comprise the following steps:

constructing adaptive triangular mesh over the selected patch, wherein the patch can be selected by stroke or be selected using specified mask;

constructing the local features manifold structure between each mesh vertex and pixels on the boundary;

computing the color difference between pixels on the source patch boundary and corresponding pixels overlaid by them in the target image, and then generating the interpolation value of each mesh vertex.

The value at each pixel is obtained by linear interpolation of three values at the vertices of the containing triangle. The interpolated membrane is added to the cloned patch to get the final result.

Figure 6:
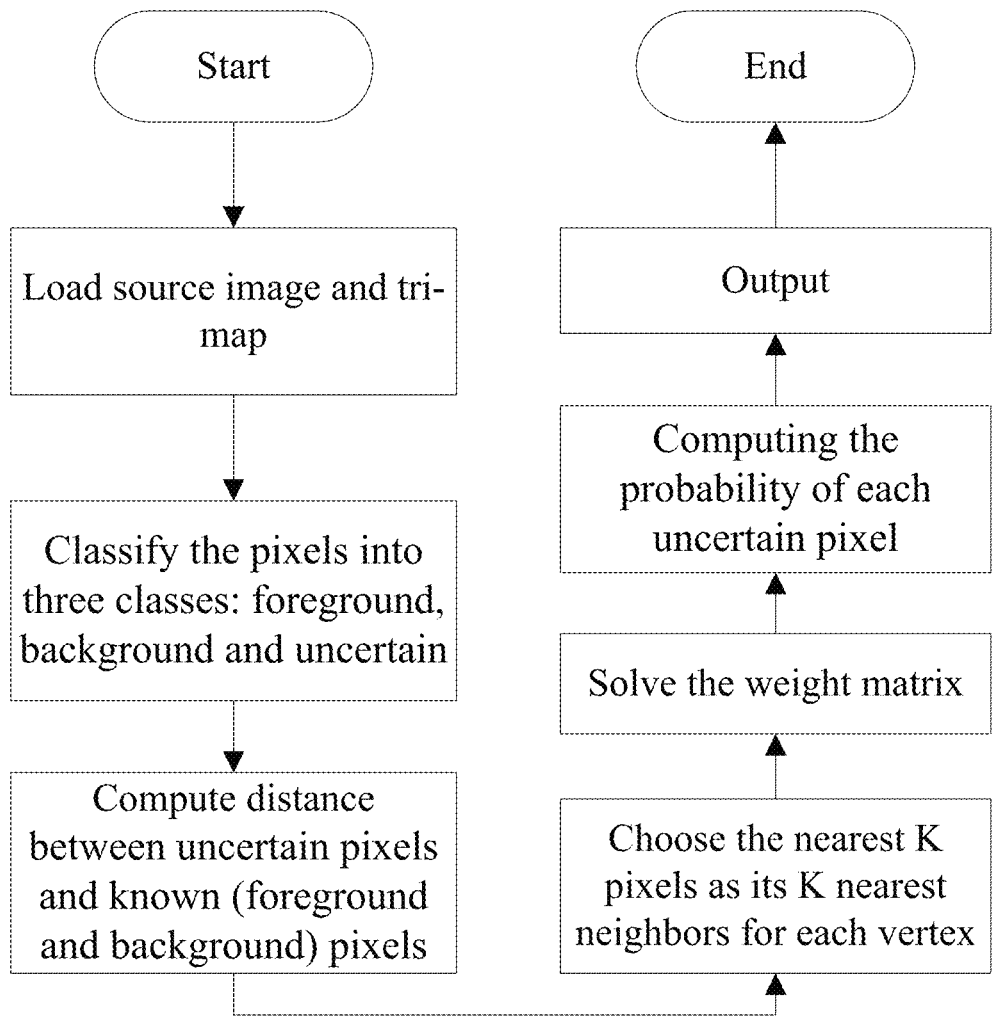
FIG. 6 is the flowchart showing image matting of the present invention.

FIG. 6 is the flowchart showing image matting. Firstly, the pixels are classified into three classes: foreground, background and uncertain with source image and tri-map. Then, the local features manifold structure between uncertain pixels and known (foreground and background) pixels is constructed. Finally, the result is generated by computing the probability of each uncertain pixel.

Figure 7:
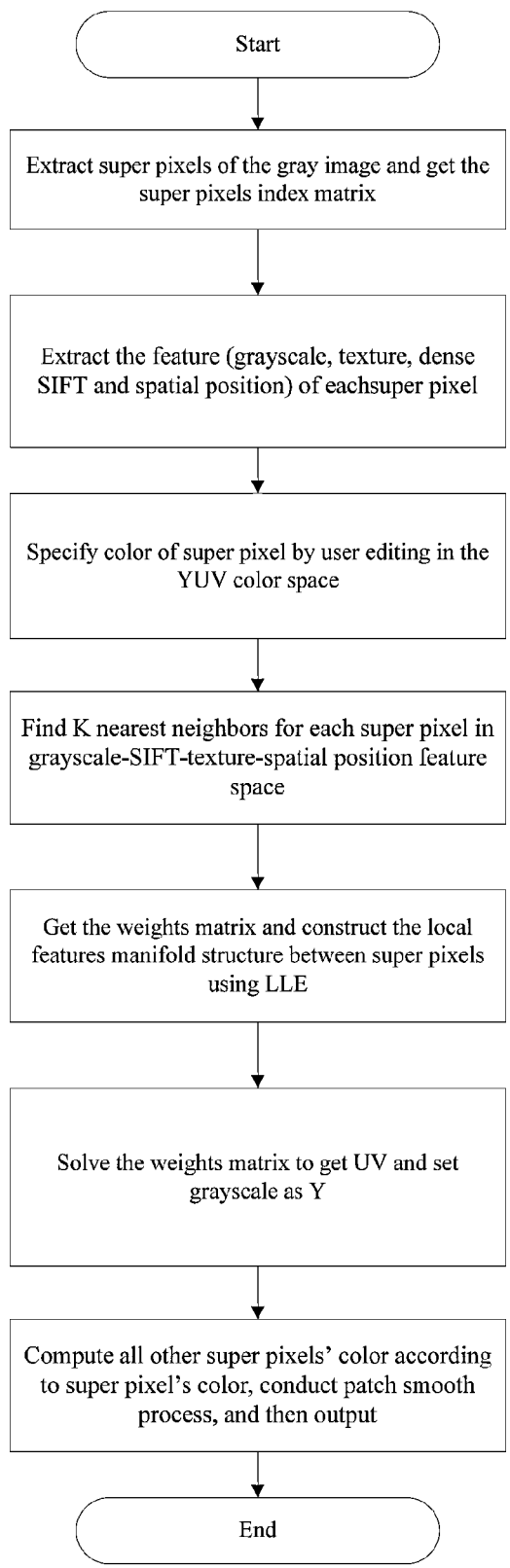
FIG. 7 is the flowchart showing gray image colorization of the present invention.

FIG. 7 is the flowchart showing gray image colorization. Firstly, the feature of each super pixel and construct the local features manifold structure are extracted. Then, all other super pixels' color is computed according to user specified super pixel's color. Finally, the grayscale intensity is taken as the Y channel in the YUV color space and the final result is generated after smooth processing.

The present invention proposes a method for editing propagation of video and image content based on local feature structure preservation. The framework is simple and easy to implement with high time-space efficiency. The invention proposes and implements the local features manifold structure preserving method which solves the problem of color transition regions and improves the realism of the result in video and image processing. At the same time, the invention has a high automation and reduces user interaction. The invention designs and implements five applications such as automatic color transformation, interactive color editing, image matting, video cloning and gray image colorization based on the local features manifold structure preserving for editing propagation in video and image method, which also proves good scalability of the method.

The present invention proposes a framework which can preserve local features manifold structure in video and image while avoiding artifacts during video and image processing. At the same time, the framework is applied to five typical applications such as automatic color transformation, interactive color editing, image matting, video cloning and gray image colorization.

The local features manifold structure preserving for editing propagation in video and image method of the present invention has the following advantages. For the areas of color transition in video and image, the method can preserve the local features manifold structure between the pixels in these areas during video and image editing process while avoiding problems in these areas such as color division and color overflow, and can ensure that the color of the generated result transits smoothly.

It should be noted that, the technicians in the art obviously can make various modifications and variations to the present invention without departing from the spirit and scope of the present invention. Hence, any equivalent modification regarding the structure or the process flow on the basis of present description and drawings, whether with direct or indirect application to other relevant technical fields, are considered to fall within the scope of protection of the present invention.

What is claimed is:

1. A method for editing propagation of video and image content based on local feature structure preservation, comprising:

Step S100, mapping all pixels in an input original image and/or video key frames to a selected feature space;

Step S200, finding K nearest neighbor pixels for each pixel according to feature vectors' Euclidean distance in the selected feature space;

Step S300, using Locally Linear Embedding (LLE) dimension reduction to construct a locally linear relationship between each pixel and its K nearest neighbor pixels in the selected feature space;

Step S400, mapping user specified editing requests on the input original image and/or video key frames to all or a part of pixels in the input original image and/or video key frames in the selected feature space;

Step S500, according to the locally linear relationship in Step S300 and by means of the resulting editing requests in Step S400, propagating the user specified editing requests to all other pixels in the input original image and/or video key frames;

and Step S600, reversely mapping all pixels which have been modified by propagation in the selected feature space to the input original image and/or video key frames, and replacing the corresponding pixels in the input original image and/or video key frames, so as to generate a resulting image and/or video key frames.

2. The method for editing propagation of video and image content based on local feature structure preservation of claim 1, wherein in the selected feature space, pixels cluster according to the similarity of their feature vectors, that is, the smaller the Euclidean distance between two pixels is, the more similar the feature vectors of two pixels is, and vice versa.

3. The method for editing propagation of video and image content based on local feature structure preservation of claim 2, wherein LLE dimension reduction in Step S300 comprises:

for any pixel i, supposing a vector $X_i$ to represent the feature vector of the pixel i, $X_{i1}; \ldots; X_{ik}$ to represent the feature vectors of K nearest neighbor pixels of $X_i$, and N is the total number of all pixels in the feature space, a linear combination coefficient $W_{ij}$ is constructed as:

$$\min \sum_{i=1}^{N} \left\| X_i - \sum_{j=1}^{K} w_{ij} X_{ij} \right\|^2,$$

namely, calculating squares of a module of difference between each pixel's feature vector and its K nearest neighbor pixels' linear combination, and minimizing the sum of the squares by using the least square method, so as to generate the optimal linear combination coefficient $W_{ij}$ between each pixel and each of its K nearest neighbor pixels, wherein the linear combination coefficient corresponds to the locally linear relationship in Step S300.

4. The method for editing propagation of video and image content based on local feature structure preservation of claim 3, wherein propagating the user specified editing requests in Step S500 is achieved by minimizing an energy equation:

$$E = \lambda \sum_{i \in S} (z_i - g_i)^2 + \sum_{i=1}^{N} \left( z_i - \sum_{z_j \in N_i} w_{ij} z_j \right)^2,$$

wherein E is the energy, λ is an adjustable parameter, S is a set of pixels that the user specified editing requests covers, $g_i$ is the user specified editing requests for pixel i, $Z_i$ is the editing propagation result of pixel i, $N_i$ is the set of K nearest neighbor pixels of pixel i, and $Z_{ij}$ is the editing propagation result of the j-th neighbor pixel of pixel i, wherein the equation is solved by minimizing the value of E, thus generating the optimal $Z_i$ of each pixel to complete the propagation.

5. The method for editing propagation of video and image content based on local feature structure preservation of claim 4, wherein the specified editing requests aim at automatic color transformation or interactive color editing, the components of the feature vector of a pixel are RGB color values, the selected feature space is a RGB color space; and
wherein in the feature space, the pixels cluster according to the similarity of their RGB values, and a selected K nearest neighbor pixels are those K pixels which have the most similar color values.

6. The method for editing propagation of video and image content based on local feature structure preservation of claim 4, wherein the specified editing requests aim at image and video matting or cloning, the components of the feature vector are RGBXYT values, wherein RGB indicates color value, XY indicates the spatial coordinates of pixels, and T indicates an index of the key frames, and the selected feature space is a RGBXYT six dimensional space; and
wherein in the feature space, the pixels cluster according to the similarity of their RGB values and spatial coordinates, a selected K nearest neighbor pixels are those K pixels which have the most similar color values and spatial coordinates, and the feature vectors are compared in term of the color values, spatial distances, and T values.

7. The method for editing propagation of video and image content based on local feature structure preservation of claim 4, wherein the specified editing requests aim at gray image colorization, the components of the feature vector are grayscale values, SIFT, texture and spatial coordinates, the selected feature space is a grayscale-SIFT-texture-spatial coordinates space; and
wherein in the feature space, the pixels cluster according to the similarity of their grayscale value, SIFT, texture and spatial coordinates, a selected K nearest neighbor pixels are those K pixels which have the most similar grayscale value, SIFT, texture and spatial coordinates, and the feature vectors are compared in term of the grayscale value, SIFT, texture and spatial coordinates.

8. The method for editing propagation of video and image content based on local feature structure preservation of claim 2, wherein mapping the user specified editing requests to the corresponding pixels in the input original image and/or video key frames in the selected feature space in Step S400 comprises:
mapping the user specified editing requests for automatic color transformation to a color theme to be modified; or
mapping the user specified editing requests for interactive color editing to specified pixels in the original input image and/or video key frames so they can be replaced with specified colors; or
mapping the user specified editing requests for image matting to pixels of a given black-white-gray tri-map; or
mapping the user specified editing requests for video cloning to pixels of a selected cloning region; or
mapping the user specified editing requests for gray image colorization to pixels in regions with specified tones.

9. The method for editing propagation of video and image content based on local feature structure preservation of claim 2, wherein propagating the specified editing requests in step S500 comprises:
for editing requests for automatic color transformation, propagating a specified color to other pixels for changing color thereof; or
for editing requests for interactive color editing, propagating a user's specified color to other pixels for changing color thereof; or
for editing requests for image matting, according to a white foreground and black background determined by a black-white-gray tri-map, generating a probability that a pixel of a gray region belongs to the foreground region; or
for editing requests for video cloning, according to color errors between a boundary of an inserted region and a target background, changing a color of the inserted region; or
for editing requests for gray image colorization, colorizing all pixels according to a super pixels' manifold structure.

10. The method for editing propagation of video and image content based on local feature structure preservation of claim 1, wherein after propagating the user specified editing requests to all other pixels in the input original image and/or video key frames in Step S500, the method further comprises: handling exceptions in which the propagated pixel(s) has a feature value beyond a limit.

11. The method for editing propagation of video and image content based on local feature structure preservation of claim 10, wherein said handling the exceptions comprises:
processing the feature value(s) whose color is abnormal;
processing the feature value(s) whose texture is abnormal;

processing the feature value(s) whose spatial coordinates are abnormal; and/or processing the feature value(s) of boundary pixels, and then generating final propagation results.

12. The method for editing propagation of video and image content based on local feature structure preservation of claim 11, wherein processing the feature value(s) of boundary pixels comprises:

obtaining the color differences between the boundary pixels and the pixels which are near the boundary pixels in the original input image and/or video key frames, and modifying a propagation relationship of relevant pixels.

* * * * *